SQUARE WAVE GENERATOR WITH CONSTANT START-STOP CHARACTERISTICS

Filed May 23, 1958

INVENTORS
DONAT E. BEAULIEU &
ISAAC CIMERMAN
BY E. J. Norton
ATTORNEY 3,054,072

SQUARE WAVE GENERATOR WITH CONSTANT START-STOP CHARACTERISTICS

Donat E. Beaulieu, Collingswood, and Isaac Cimerman, Haddonfield, N.J., assignors to Radio Corporation of America, a corporation of Delaware Filed May 23, 1958, Ser. No. 737,425
10 Claims. (Cl. 331—108)

Figure 1:
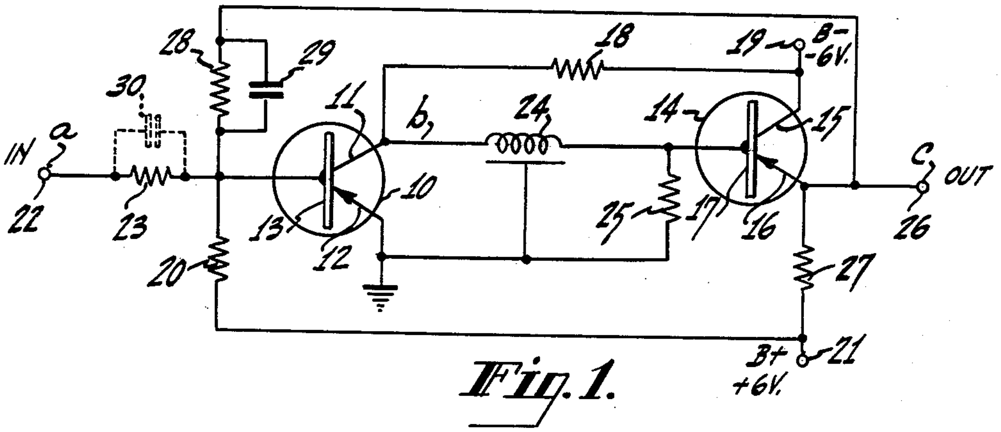

This invention relates to square wave generators. Particularly, the invention relates to a square wave generator using two current conducting devices such as transistors and a passive delay network arranged so that the generator when turned on always begins the period of oscillations at zero degrees.

Square wave generators are presently used in a wide range of applications to complete timing, transmission and other functions. The development of complicated equipments has made the operating characteristics of the generators used therein very important. One difficulty encountered in adapting known square wave generators for use in such equipments is the fact that the generators upon being switched on may produce a first pulse or square wave which is only a portion of a complete pulse cycle. This result depends upon the warm-up period of the generator, and so on. A further difficulty in the use of the known square wave generators, for example, of the type constructed as multivibrators and similar circuits, is the fact that the generators when turned on may arbitrarily produce a first pulse of either a positive, negative or zero polarity, depending upon the state of the generator when first placed in operation, and so on.

There are a number of applications in recently developed equipments such as are used in data handling systems, telemetering systems, and so on, where it is essential that a square wave generator when turned on always produce a complete first pulse or square wave of given polarity. That is, the period of oscillations must always start at zero degrees. Various switching and control functions in the high speed equipments are set to occur only upon the appearance of the complete first pulse, the appearance of any other pulse or a portion only of a complete pulse resulting in distortion and an operating failure in the equipments. It is desirable, therefore, that a square wave generator be provided capable of performing accurately and efficiently in applications where the period of oscillations is required to always start at zero degrees.

An object of the invention is to provide an improved square wave generator having an accurate period of oscillations which always starts at zero degrees when the generator is placed in operation.

A further object is to provide a novel square wave generator using two transistor devices and a passive delay network which is simple in operation and in construction.

A still further object is to provide an improved square wave generator having a period of oscillations which can be readily switched on and off and always starts at zero degrees.

Briefly, a square wave generator is provided according to the objects of the invention comprising two current conducting devices and a passive delay network. A first current conducting device is arranged to be normally conducting in response to the level of an input voltage signal of the proper potential supplied to the device from a suitable source. A second current conducting device is connected as an emitter-follower amplifier stage such that the second device is always conducting, normally producing an output signal at reference potential at the output of the generator. The input of the second device is connected to the output of the first device through a passive delay network, while the output of the second device and of the generator is fed back to the input of the first device over a feedback path.

In stand-by operation, therefore, the two current conducting devices are both conducting. When it is desired to switch the generator on, the level of the input voltage signal is shifted to a level sufficient to render the first device non-conducting. After a time delay determined by the value of the passive delay network, the change in the conducting state of the first device causes the second device to conduct correspondingly more heavily. The leading edge of the first square wave of a polarity determined by the direction of current conduction through the second device appears at the output of the generator. The change in output potential is fed back to the input of the first device, and the first device becomes conducting. The resulting change in the conducting state of the first device is applied to the second device following a time delay determined by the value of the passive delay network. The second device returns to its normal level of current conduction, returning the output of the generator to the reference potential and producing the trailing edge of the first square wave. This change in output potential is fed back to the input of the first device, rendering the first device non-conducting, and so on. The generator will continue to oscillate in the manner described to produce a train of square waves of constant width and of given frequency.

When it is desired to turn the generator off, the level of the input voltage signal is merely returned to the original or standby level. The first device becomes conducting and remains conducting until the level of the input voltage signal is again shifted to the level sufficient to render the first device nonconducting. The second device remains in or returns to its normal level of current conduction following a time delay determined by the passive delay network, according to the instant in the operating cycle of the generator at which it is turned off. The output of the generator remains at the reference potential until the generator is again placed in operation.

Figure 2:
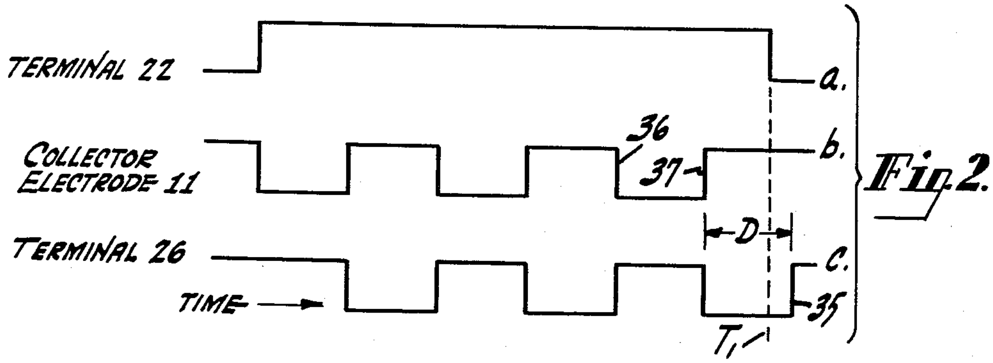
Figure 3:
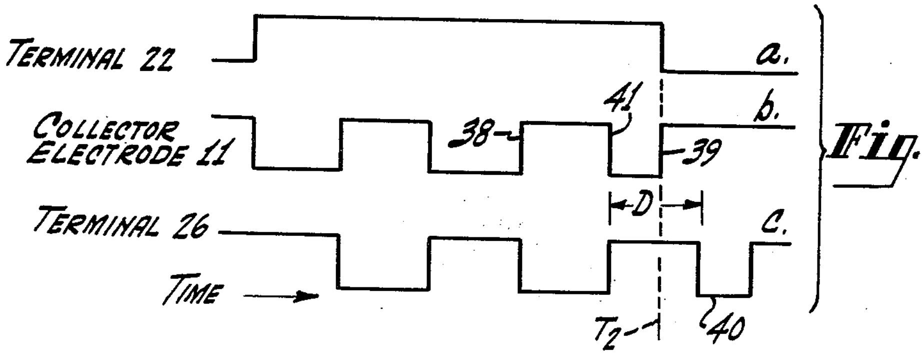

A more detailed description of the invention will now be given in connection with the accompanying drawing in which:

FIGURE 1 is a circuit diagram of one embodiment of a square wave generator constructed according to the invention; and FIGURES 2 and 3 are curves useful in describing the operation of the invention as depicted in FIGURE 1.

As shown in FIGURE 1, a first current conducting device in the form of a transistor 10 is provided having a collector electrode 11, emitter electrode 12 and base electrode 13. A second current conducting device in the form of a transistor 14 is also provided having a collector electrode 15, emitter electrode 16 and base electrode 17. Transistors 10 and 14 are shown and will be described as transistors of N-type conductivity and particularly P-N-P junction transistors. The invention is, however, not to be considered as limited to the use of this type of transistor.

The emitter electrode 12 of transistor 10 is connected to a point of zero reference potential defined as ground. It is to be understood that the ground connection need not be necessarily completed to an earth ground but may be completed to any point of suitable reference potential. The collector electrode 11 of transistor 10 is connected through a bias resistor 18 to a negative terminal 19 of a source of unidirectional potential. The base electrode 13 of transistor 10 is connected through a reverse bias resistor 20 to the positive terminal 21 of a source of unidirectional potential and through an input resistor 23 to an input terminal 22. The collector electrode 11 of transistor 10 is connected to the base electrode 17 of transistor 14 over an electrical path including a passive delay network 24 connected between the collector electrode 11 and ground. A resistor 25 connected to ground serves to terminate the network 24 in its characteristic impedance and to provide a proper biasing of the base electrode 17. The network 24 may be any suitable delay network known in the art and may, for example, include inductance-capacitance sections arranged in a known manner.

The emitter electrode 16 of transistor 14 is connected to an output terminal 26 and to the positive terminal 21 through a resistor 27, the collector electrode 15 of transistor 14 being connected to the negative terminal 19. A feedback path is completed from the emitter electrode 16 of transistor 14 to the base electrode 13 of transistor 10 over a connection including a resistor 28 and a capacitor 29 connected across the resistor 28. Capacitor 29 serves to remove the stored charge from the transistor 10, providing for the more rapid switching action of the transistor 10.

In stand-by operation, an input voltage signal which, in the example given, is negative with respect to ground potential is applied from a suitable source to the base electrode 13 of transistor 10 via input terminal 22 and resistor 23. The values of resistors 18, 20 and 23 are chosen so that the emitter electrode 12 is positive with respect to the base electrode 13, while the collector electrode 11 is negative with respect to the base electrode 13. Transistor 10 conducts at a level determined by the value of resistor 20, causing the voltage at the collector electrode 11 to approach the voltage at the emitter electrode 12 or ground potential. The base electrode 17 of transistor 14 is biased over the electrical path including the delay network 24 and resistor 25 negative with respect to the emitter electrode 16 and positive with respect to the collector electrode 15. Transistor 14 conducts, and a constant direct current (D.C.) output signal at reference potential is applied from the emitter electrode 16 to the terminal 26.

In stand-by operation, therefore, both transistors 10 and 14 are conducting. This condition continues as long as the input voltage signal applied to the base electrode 13 of transistor 10 via terminal 22 remains negative with respect to ground causing transistor 10 to remain conducting. Transistor 14 is connected as an emitter-follower amplifier stage and conducts at a level determined by the value of resistor 27 and the voltages supplied at terminals 19, 21 to supply a constant D.C. signal at reference or ground potential to the output terminal 26.

When it is desired to switch the square wave generator on so as to produce a period of oscillations, the input voltage signal applied to the base electrode 13 of transistor 10 is raised toward the level of the voltage at the emitter electrode 12. The emitter electrode 12 goes negative with respect to the base electrode 13, and transistor 10 becomes non-conducting. The voltage at the collector electrode 11 drops toward B— or the level of the voltage at terminal 19. Following a time delay determined by the value of the delay network 24, this change in the collector voltage of transistor 10 is applied to the base electrode 17 of transistor 14. The base electrode 17 is driven more negative toward B— with respect to the emitter electrode 16. Transistor 14 conducts more heavily, producing a negative-going D.C. signal at the emitter electrode 16 and terminal 26, approaching in level the voltage supplied at terminal 19 or B—. The negative-going signal is fed from the emitter electrode 16 to the base electrode 13 of transistor 10 over the feedback path including resistor 28 and parallel-connected capacitor 29. The base electrode 13 is driven negative toward B— such that the emitter electrode 12 is positive with respect to the base electrode 13. Transistor 10 conducts, and the collector electrode 11 rises toward ground.

Following a time delay determined by the value of the delay network 24, the change in collector voltage appears at the base electrode 17 and emitter electrode 16 of transistor 14. Transistor 14 returns to its normal operating level of current conduction, causing the output signal to return to the level at reference potential. A first complete square wave of negative polarity is thus produced by the generator. The change in output potionental is fed back to the base electrode of transistor 10, causing transistor 10 to become non-conducting. This action occurs since the input voltage signal supplied via terminal 22 is also at ground potential. Thereafter, the drop in collector voltage causes, following the time delay determined by the network 24, transistor 14 to conduct more heavily. The leading edge of the next or second square wave appears at terminal 26. The operation of the generator continues in the manner described to produce a train of square waves of constant width and frequency at terminal 26 for application to a utilization circuit. The width and frequency of the square waves is determined according to the value of the network 24.

The period of oscillations can be stopped at any time by merely lowering the level of the input voltage signal toward B— sufficient to cause transistor 10 to conduct or to remain conducting, depending upon the moment in the operating cycle of the generator at which the generator is turned off. The conduction of transistor 10 causes transistor 14 to remain in or return to its original state of current conduction following the delay in the network 24, producing a constant current signal at terminal 26 at reference potential.

It can be seen that the operation of the invention depends on the control of the input to transistor 10. When the generator is switched off, a proper voltage is supplied to the base electrode 13 to hold transistor 10 conducting. When the generator is switched on, the voltage input supplied via terminal 22 is shifted to a level sufficient to cause transistor 10 to remain non-conducting. In this condition, transistor 10 is responsive to the change in feedback voltage supplied from the emitter electrode 16 of transistor 14 to be made alternately conducting and non-conducting at a rate determined by the network 24.

A feature of the invention is the fact that the period of oscillations not only always starts at zero degrees but, in addition, always stops at zero degrees. It will first be assumed that at the moment the generator is turned off by the shift in level of the input voltage signal, transistor 10 is conducting at the level required to produce the negative-going portion of a square wave at terminal 26. The operation is shown in the series of curves in FIGURE 2. Curve 2*a* represents the signal at terminal 22, curve 2*b* represents the change in potential at the collector electrode 11 of transistor 10 and curve 2*c* represents the signal at terminal 26. It is assumed that at time $T_1$ the generator is switched off by lowering the input signal toward B— or sufficiently negative to render transistor 10 conducting. Transistor 10 is at this time $T_1$ conducting, and, therefore, no change occurs in the condition of transistor 10. Transistor 14 is, however, conducting heavily to produce the negative-going portion of the square wave 35 in response to the previous change at point 36 of the transistor 10 from a conducting to non-conducting state. Following a time delay D corresponding to the value of network 24, the transistor 14 functions in response to the change of the transistor 10 from a non-conducting to conducting state at point 37 to return to its normal level of current conduction. A continuous output signal at reference potential appears at the terminal 26.

The operation of the generator on being switched off at a time when transistor 10 is non-conducting is given in the curves of FIGURE 3. Again, curve 3*a* represents the signal at terminal 22, curve 3*b* represents the change in potential at collector electrode 11 and curve 3*c* represents the signal at terminal 26. At time $T_2$, transistor 10 is non-conducting and transistor 14 is in its original or normal level of current conduction in response to the change of transistor 10 from a non-conducting to a conducting state at point 38. Upon the shift in the level of the input signal at time $T_2$, transistor 10 becomes conducting as indicated at point 39 and remains conducting. Following a time delay D determined by network 24, transistor 14 becomes heavily conducting to produce the negative-going portion of square wave 40 in response to the change of transistor 10 from a conducting to a non-conducting state at point 41. Following a delay D, transistor 14 returns to its normal level of current conduction in response to the change of transistor 10 at time $T_2$ (point 39) from a non-conducting to a conducting state. A continuous signal at reference potential appears at terminal 26. Regardless of the time at which the generator of the invention is switched off and on, the period of oscillations always starts at zero degrees and ends at zero degrees. The first square wave is always complete and of predetermined polarity.

Normally, the shift in the level of the input voltage signal will be of a relatively long time duration. However, in certain applications such as in pulse modulation systems, and so on, shifts of short time duration may occur. A capacitor 30 may be connected across the input resistor 23 to achieve fast response thereacross, as indicated by the dotted line.

In describing the invention, reference has been made to a particular range of potentials. In practice, the range of potentials is determined according to the requirements of the particular application. For example, terminal 19 may be at ground potential with terminal 21 at a positive potential and the emitter electrode 12 of transistor 10 connected to a suitable source of potential of a level sufficient to bias the emitter electrode 12 positive with respect to the base electrode 13 in stand-by operation. In this application, the input voltage signal is shifted between ground potential and the level of the potential supplied to the emitter electrode 12 in order to switch the generator on and off. The operation of the generator will be the same as described.

Reference has been made to the use of transistors of N-type conductivity. In practice, any suitable type of transistor may be used for transistors 10 and 14 to provide the operation desired. Transistors of P type conductivity such as N-P-N junction transistors may be used for transistors 10 and 14 by altering the connections and polarity of voltages supplied to the electrodes of the transistors in a known manner. One of the transistors may be of P-type conductivity, while the second transistor is of N-type conductivity by the application of bias voltages of proper polarity to the electrodes of the transistors. The polarity of the square waves produced by the generator can, of course, be determined in a number of known manner. A phase inverter arranged for selective operation may be connected to terminal 26 responsive to the train of negative-going square waves to either pass the train of square waves or invert the train or a portion of the train to produce one or more positive-going square waves. A transistor of P-type conductivity may be used for transistor 14 such that the direction of current conduction therethrough produces a train of positive-going square waves at terminal 26, and so on. While one embodiment of the invention is shown in FIGURE 1, various modifications may be made thereto, as indicated above, without departing from the spirit of the invention.

The operating frequency of the invention determined by the delay network 24 is limited for the most part by the response of the transistors used. By way of example, a generator was constructed according to the invention to operate in the range of 1 megacycle. Transistors 10 and 14 were P-N-P junction transistor known in the art as 2N269. The network 24 included four sections each ¼ microseconds long with a 560 ohm characteristic impedance. The values of the various components given only by way of example were as follows:

| | | |
|---|---|---|
| Resistor **18** | kilohms | 1.8 |
| Resistor **20** | do | 18 |
| Resistor **23** | do | 4.3 |
| Resistor **25** | ohms | 560 |
| Resistor **27** | kilohms | 1.5 |
| Resistor **28** | do | 4.3 |
| Capacitor **29** | micromicrofarads | 180 |

A square wave generator is provided by the invention having advantages and features which make it readily adaptable for use in a wide range of applications. Features of the invention are the ease with which the oscillations may be switched on and off, the accuracy of the period of oscillations, and the fact that the period of oscillations always begins and ends at zero degrees.

What is claimed is:

1. A square wave generator comprising a transistor device having input, output and reference electrodes, means to apply the proper biasing potentials to said electrodes to cause said device to remain conducting in response to an input signal of a first level normally applied to said input electrode and to become non-conducting upon said input signal being shifted to a second level, an output circuit, a passive delay network, means to connect said output electrode to said output circuit through said network, said network being arranged to delay by a predetermined amount any change in the level of a signal applied to said output circuit from said output electrode resulting from a change in the conducting state of said device, said output circuit including means for deriving an output signal from the delay signal applied thereto from said network, a direct current feedback path for applying said output signal from said output circuit to said input electrode to cause said device upon said input signal being shifted to said second level to become alternately non-conducting and conducting at a frequency rate determined according to the value of said network.

2. A square wave generator as claimed in claim 1 and wherein said transistor device is of N-type conductivity.

3. A square wave generator as claimed in claim 1 and wherein said transistor device is of P-type conductivity.

4. A square wave generator comprising a first current conducting device having an input and output electrode, means to bias the electrodes of said first device to cause said first device to remain conducting in response to an input signal at a first level normally applied to said input electrode and to become non-conducting upon said input signal being shifted to a second level, a passive delay network, a second current conducting device having an input and output electrode, means to connect the output electrode of said first device to the input electrode of said second device through said network, said network being of a value to delay by a predetermined amount any change in the level of a signal fed from the output electrode of said first device to the input electrode of said second device resulting from a change in the conducting state of said first device, means to bias the electrodes of said second device to cause said second device to be always conducting at a level determined by the level of the delayed signal applied to the input electrode thereof from said network, said second device producing at the output electrode thereof an output signal varying in level according to the change in the level of said delayed signal, a direct current feedback path to apply said output signal from the output electrode of said second device to the input electrode of said first device, said first device being responsive to said output signal upon said input signal being at said second level to become alternately non-conducting and conducting at a frequency rate determined according to said value of said network.

5. A square wave generator comprising a first transistor device having an input and output electrode, means to bias the electrodes of said first device to cause said first device to remain conducting in response to an input signal at a first level normally applied to said input electrode and to become non-conducting upon said input signal being shifted to a second level, a delay network, a second transistor device having an input and output electrode, means to connect the output electrode of said first device to the input electrode of said second device through said network, said network being of a value to delay by a predetermined amount any change in the level of a signal fed from the output electrode of said first device to the input electrode of said second device resulting from a change in the conducting state of said first device, means to bias the electrodes of said second device to cause said second device to be always conducting at a level determined by the level of the delayed signal applied to the input electrode thereof from said network, said second device producing at the output electrode thereof an output signal varying in level according to the change in the level of said delayed signal, an output terminal connected to the output electrode of said second device, a feedback path to apply said output signal from the output electrode of said second device to the input electrode of said first device, said first device being responsive to said output signal upon said input signal being at said second level to become alternately non-conducting and conducting at a frequency rate determined according to said value of said network.

6. A square wave generator comprising a first transistor device having base, collector and emitter electrodes, means to bias said electrodes to cause said first device to remain conducting in response to an input signal at a first level normally applied to said base electrode and to become non-conducting upon said input signal being shifted to a second level, a passive delay network, a second transistor device having base, collector and emitter electrodes, means to connect the collector electrode of said first device to the base electrode of said second device through said network, said network being of a value to delay by a predetermined amount any change in the level of a signal applied from the collector electrode of said first device to the base electrode of said second device resulting from a change in the conducting state of said first device, means to bias the electrodes of said second device to cause said second device to be always conducting at a level according to the level of the delayed signal applied to the base electrode thereof from said network, said second device producing at the emitter electrode thereof an output signal of a level determined according to the level of said delayed signal, an output terminal connected to the emitter electrode of said second device, a feedback path to apply said output signal from the emitter electrode of said second device to the base electrode of said first device, said first device being responsive to said output signal upon said input signal being shifted to the second level to become alternately non-conducting and conducting at a frequency rate determined according to the value of said network.

7. A square wave generator as claimed in claim 6 and wherein said first and second transistor devices are of the same type of conductivity.

8. A square wave generator as claimed in claim 6 and wherein said first and second transistor devices are both of N-type conductivity.

9. A square wave generator as claimed in claim 6 and wherein said network is an inductance-capacitance delay network.

10. A square wave generator comprising a current conducting device having an input, output and reference electrode, means to apply the proper biasing potentials to said electrodes to cause said device to remain conducting in response to an input signal of a first level normally applied to said input electrode and to become non-conducting upon said input signal being shifted to a second level, a delay network of lumped inductance and capacitance directly connected to said output electrode and arranged to delay by a predetermined amount any change in the level of the signal fed to said network from said output electrode resulting from a change in the conducting state of said device, an output circuit connected to said network and including means arranged to be always current conducting at a level determined by the level of the delayed signal applied to said output circuit for producing an output signal, and a feedback path for applying said output signal from said output circuit to said input electrode to cause said device upon said input signal being shifted to said second level and only for the period in which said input signal is at said second level to become alternately conducting and non-conducting at a frequency rate determined by said network.

References Cited in the file of this patent

UNITED STATES PATENTS

| | | |
|---|---|---|
| 2,662,183 | Bridges | Dec. 8, 1953 |
| 2,681,996 | Wallace | June 22, 1954 |
| 2,697,172 | Szerlip | Dec. 14, 1954 |
| 2,758,211 | Hochman | Aug. 7, 1956 |
| 2,782,311 | Colander et al. | Feb. 19, 1957 |
| 2,827,568 | Altschul | Mar. 18, 1958 |
| 2,828,450 | Pinckaers | Mar. 25, 1958 |
| 2,831,113 | Weller | Apr. 15, 1958 |
| 2,840,727 | Guggi | June 24, 1958 |
| 2,848,613 | Green et al. | Aug. 19, 1958 |
| 2,861,258 | Walsh et al. | Nov. 18, 1958 |
| 2,901,669 | Coleman | Aug. 25, 1959 |
| 2,912,574 | Gensel | Nov. 10, 1959 |
| 2,947,915 | Patchell | Aug. 2, 1960 |